(12) United States Patent
De Bevilacqua et al.

(10) Patent No.: US 10,278,267 B2
(45) Date of Patent: Apr. 30, 2019

(54) LIGHTING SYSTEM

(71) Applicant: ARTEMIDE S.p.A., Milan (IT)

(72) Inventors: Carlotta Francesca Isolina Maria De Bevilacqua, Milan (IT); Andrea Gallucci, Guanzate (IT)

(73) Assignee: ARTEMIDE S.P.A. (IT)

( * ) Notice: Subject to any disclaimer, the term of this patent is extended or adjusted under 35 U.S.C. 154(b) by 0 days.

(21) Appl. No.: 15/483,557

(22) Filed: Apr. 10, 2017

(65) Prior Publication Data

US 2017/0295628 A1    Oct. 12, 2017

(30) Foreign Application Priority Data

Apr. 11, 2016  (IT) .......................... 102016000037046

(51) Int. Cl.
*H05B 37/02* (2006.01)
*H04B 10/114* (2013.01)
*H04B 10/116* (2013.01)

(52) U.S. Cl.
CPC ....... *H05B 37/0272* (2013.01); *H04B 10/116* (2013.01); *H04B 10/1149* (2013.01)

(58) Field of Classification Search
CPC ................ H05B 37/02; H05B 37/0245; H05B 37/0272; H04B 10/1149; H04B 10/116
See application file for complete search history.

(56) References Cited

U.S. PATENT DOCUMENTS

| 5,726,644 A | 3/1998 | Jednacz et al. | |
|---|---|---|---|
| 8,842,009 B2 * | 9/2014 | Jones | H05B 37/0272 340/468 |
| 2005/0164630 A1 | 7/2005 | Kates | |
| 2010/0327780 A1 * | 12/2010 | Hoschopf | H05B 37/0272 315/312 |
| 2012/0299509 A1 * | 11/2012 | Lee | H04L 41/0806 315/291 |
| 2014/0368116 A1 * | 12/2014 | Walters | H05B 37/0272 315/152 |
| 2015/0130351 A1 * | 5/2015 | Braunstein | H05B 37/0227 315/86 |
| 2015/0142714 A1 | 5/2015 | Golota et al. | |
| 2015/0296599 A1 * | 10/2015 | Recker | H05B 37/0272 315/153 |
| 2016/0286629 A1 * | 9/2016 | Chen | H05B 37/0272 |
| 2017/0055332 A1 * | 2/2017 | Flach | H05B 37/0272 |
| 2017/0127499 A1 * | 5/2017 | Unoson | H04W 12/06 |
| 2017/0223811 A1 * | 8/2017 | Vangeel | G06F 8/654 |

FOREIGN PATENT DOCUMENTS

| EP | 2681877 | 1/2014 |
|---|---|---|
| WO | 2013159831 | 10/2013 |
| WO | 2016013939 | 1/2016 |

OTHER PUBLICATIONS

Corresponding Italian Search Report for dated Dec. 16, 2016.

* cited by examiner

*Primary Examiner* — Jason Crawford
(74) *Attorney, Agent, or Firm* — The Belles Group, P.C.

(57) ABSTRACT

A lighting system comprises a plurality of lighting devices interconnected with one another in a communication network, preferably a wireless communication network; the lighting devices define respective equivalent nodes of the network and are configured so that any one of said lighting devices of the lighting system selectively acts as a master, if an initial control input is received directly by that lighting device; and as a slave, if the initial control input is received by another lighting device.

14 Claims, 1 Drawing Sheet

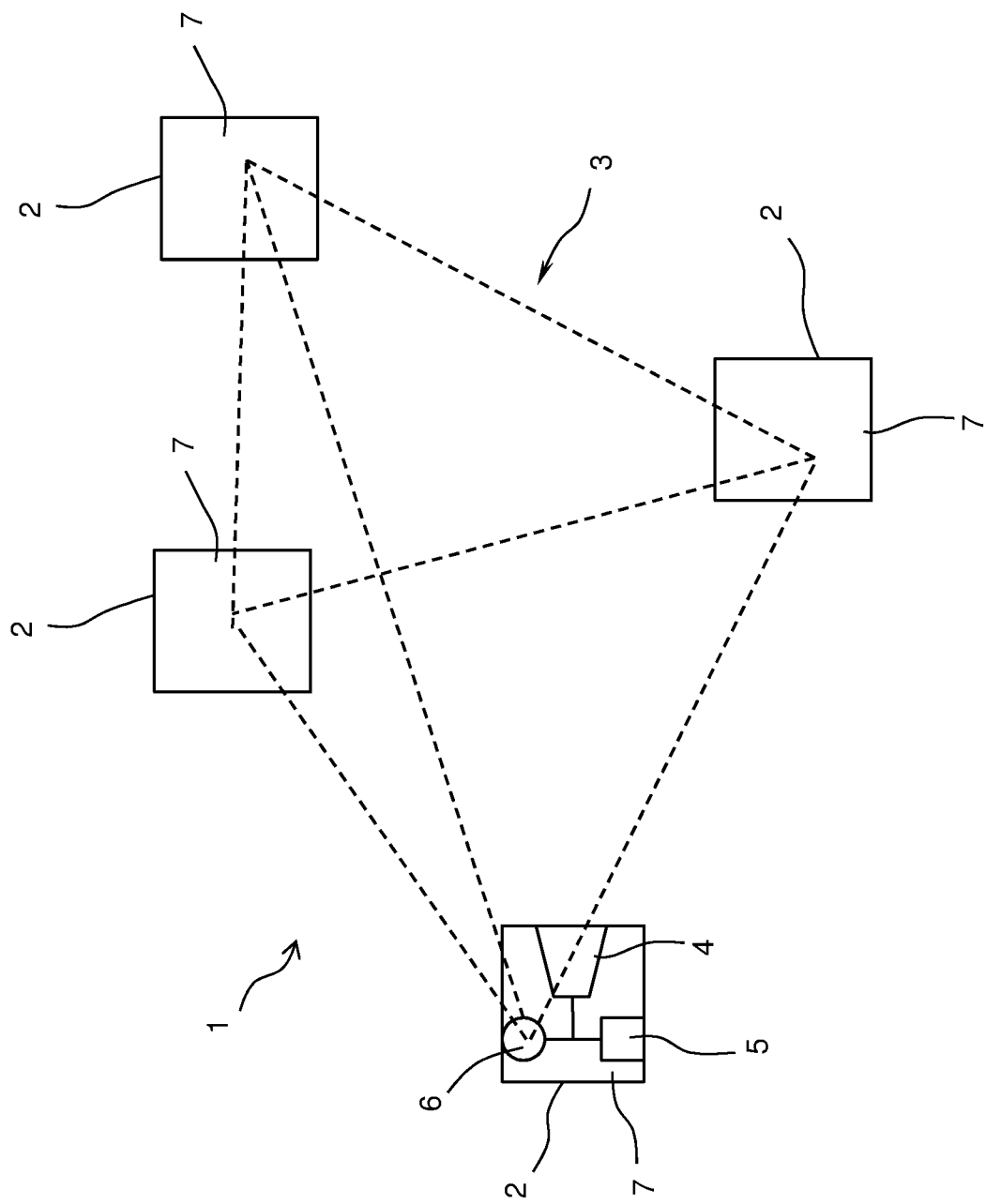

LIGHTING SYSTEM

PRIORITY CLAIM

This application claims priority from Italian Patent Application No. 102016000037046 filed on Apr. 11, 2016, the disclosure of which is incorporated by reference.

TECHNICAL FIELD

The present invention relates to a lighting system, in particular a lighting system formed by a plurality of lighting devices interconnected in a network and operating coordinately and interdependently with each other.

BACKGROUND OF THE INVENTION

In the lighting industry, it is common for a lighting device (lamp) or a group of lighting devices to be controlled by a single control device.

In the case of a system comprising a plurality of lighting devices, defining respective system units, a so-called master-slave control logic is known to be adopted: in essence, the system and all the lighting devices (i.e., the individual units) are controlled by a main unit (master) equipped with a control device.

Controls and adjustments provided by the user (for example directly via a switch, a remote control, etc.; or indirectly via a programmable controller, sensors, etc.) are sent to the main unit (master), which then in turn controls all the other units (slaves) of the system.

These control and operation modes of a lighting system may not be fully satisfactory.

In fact, in order to operate the lighting system, it is necessary to use the main unit, i.e. its control device, which is the only point of access to the system. If the user is elsewhere in the environment in which the lighting system is installed, perhaps next to another unit that is of another lighting device, he/she cannot intervene in the system.

SUMMARY OF THE INVENTION

It is therefore an object of the present invention to provide a lighting system, which allows for overcoming the drawbacks of the prior art described herein.

In accordance with this object, the present invention refers to a lighting system comprising a plurality of lighting devices interconnected with one another in a communication network, preferably a wireless communication network; wherein the lighting devices define respective equivalent nodes of the network and are configured so that any lighting device of the lighting system selectively acts as a master, if an initial control input is received directly by that lighting device; and as a slave, if the initial control input is received by another lighting device.

In particular, the network is configured so that all the lighting devices communicate and exchange data with one another and each acts in response to inputs received by any other lighting device.

Each lighting device of the lighting system constitutes a node of the network and each node receives and sends controls/data to/from all the other nodes.

In greater detail, each lighting device of the lighting system is provided with a control device, which can be directly activated by a user, possibly via a remote control, and/or by an activation device connected to the network, for example a sensor.

In particular, each lighting device comprises at least one light source, a control device that controls the light source, and a communication device associated with the control device and that connects the lighting device to the network and thus to all the other lighting devices.

The lighting devices are configured so that instructions given directly to any one of the lighting devices via the respective control device are transmitted to all the other lighting devices, which are accordingly controlled.

Preferably, the control devices are configured to operate according to an adaptive logic.

In essence, the invention provides a lighting system in which the lighting devices are all interconnected with one another in a network that is configured so that all the nodes of the network, i.e. all the lighting devices of the lighting system, communicate and exchange data with one another and each acts in response to inputs received by any other node, preferably in an adaptive way.

The configuration of the network is therefore not the typical master/slave one, where a master controls a plurality of slaves; according to the invention, each node can selectively act as a master or a slave.

The user, also understood in a more general sense as any input external to the network (such as the amount of light in the environment or the temperature, etc., detected for example by sensors), can act on any point of the network, i.e. on any node, and access and activate the system from any unit/node.

BRIEF DESCRIPTION OF THE DRAWINGS

Further features and advantages of the present invention will be apparent from the following description of a non-limiting embodiment thereof, with reference to the accompanying FIGURE, which schematically shows a lighting system according to the invention.

DETAILED DESCRIPTION OF THE INVENTION

The numeral 1 in the appended FIGURE shows as a whole a lighting system, in particular a lighting system formed by a plurality of lighting devices interconnected in a network and operating coordinately and interdependently with each other.

The lighting system 1 comprises a plurality of lighting devices 2 interconnected with each other in a communication network 3, preferably a wireless communication network.

Each lighting device 2 comprises (as shown in the FIGURE only extremely schematically and only for one of the lighting devices 2) at least one light source 4 (optionally associated with a suitable optical unit), a control device 5 that controls the light source 4, and a communication device 6 associated with the control device 5 and that connects the lighting device 2 to the network 3 and thus to all the other lighting devices 2 of the lighting system 1.

In particular, the control device 5 can be directly actuated by a user, possibly via a remote control or controller, and/or by an external activation device connected to the network 3, for example a sensor (e.g., a light sensor, a temperature sensor, etc.).

The lighting devices 2 are configured so that instructions given directly to any one of the lighting devices 2 via the respective control device 5 are transmitted (via the respective communication device 6) to all the other lighting devices 2 (i.e. to the respective control devices 5), which are accordingly controlled.

The lighting devices 2 define respective equivalent nodes 7 of the network 3 and are configured so that any lighting device 2 of the lighting system 1 selectively acts as a master, if an initial control input is received directly by that lighting device 2 (precisely, by the respective control device 5); and as a slave, if the initial control input is received by another lighting device 2.

The network 3 is thus configured so that all the lighting devices 2 communicate and exchange data with one another and each acts in response to inputs received by any other lighting device 2 connected to the network 3, i.e. by any other lighting device 2 of the lighting system 1.

Each lighting device 2 thus defines a node 7 of the network 3 and each node 7 receives and sends controls/data to/from all the other nodes 7.

Preferably, the control devices 5 are configured to operate according to an adaptive logic.

In essence, in use, any lighting device 2 actuated with an initial control input, for example by means of a direct intervention of a user or an intervention provided by a sensor or other external actuation device, momentarily acts as a master: the imparted command is processed by the control device and sent, via the communication device 6 and the network 3, to all the other lighting devices 2 connected to the network 3, which adapt their operation accordingly, possibly according to preset logics.

For example: if the initial control input is simply an on/off control, this is replicated on all the lighting devices 2 which, in turn, are turned on/off; if the initial control input controls a variation the light intensity of the directly controlled lighting device 2 (acting as a master), the command sent to the other lighting devices 2 (acting as slaves) may be of varying the intensity of the other lighting devices 2 in an equal and concordant manner, or varying the intensity of the other lighting devices 2 in the opposite way to compensate for the variation performed on the first lighting device 2 and, for instance, maintain the overall light intensity of the lighting system 1 constant; etc. Lastly, it is understood that the lighting system as described and illustrated herein can be subject to modifications and variations that do not depart from the scope of the accompanying claims.

The invention claimed is:

1. A lighting system comprising:
a plurality of lighting devices interconnected with one another in a communication network;
each of the lighting devices comprising at least one light source, a control device that controls the light source, and a communication device associated with the control device that connects the lighting device to the communication network and thus to all the other lighting devices of the lighting system, wherein the control device of each of the lighting devices is configured to be activated directly by a user and by instructions transmitted from one of the other lighting devices in the communication network;
wherein the lighting devices are configured so that instructions given to any one of the lighting devices via the respective control device are transmitted to all the other lighting devices so that each of the lighting devices is controlled from the instructions sent to the any one of the lighting devices;
wherein each of said lighting devices of the lighting system is configured to momentarily: (1) operate as a master when the lighting device directly receives an initial control input to activate the control device of the lighting device, the master transmitting instructions corresponding to the initial control input to each of the other lighting devices of the lighting system to activate the control devices of each of the other lighting devices; and (2) operate as a slave when the initial control input is received by another one of the lighting devices, the slave receiving the instructions corresponding to the initial control input from the master; and
wherein a determination as to whether each lighting device operates as the master or the slave is made based on whether the lighting device directly receives the initial control input, each of the lighting devices being configured to operate as the master at different moments in time.

2. A lighting system according to claim 1, wherein the communication network is configured so that all the lighting devices communicate and exchange data with one another and each lighting device accordingly acts in response to inputs received by any other lighting device.

3. A lighting system according to claim 1, wherein each lighting device defines a node of the communication network and each node receives data from and sends data to each of the other nodes.

4. A lighting system according to claim 1, wherein the control device of each lighting device is configured to be activated directly by a user.

5. A lighting system according to claim 1, wherein the communication network is a wireless communication network.

6. The lighting system according to claim 1 wherein the initial control input is transmitted directly to only one of the plurality of lighting devices, and wherein the instructions, which correspond to the initial control input, are transmitted to each of the other lighting devices in the communication network via direct or indirect communication with the one of the plurality of lighting devices.

7. A lighting system comprising:
a plurality of lighting devices;
each of the lighting devices comprising at least one light source, a control device operably coupled to the light source to control operation of the light source, and a communication device operably coupled to the control device, wherein the communication device of each of the lighting devices are in operable communication with one another to form a communication network; and
wherein each of the lighting devices in the communication network is configured to momentarily: (1) operate as a master when the lighting device directly receives an initial control input to activate the control device of the lighting device, the master transmitting instructions corresponding to the initial control input to each of the other lighting devices of the lighting system to activate the control devices of each of the other lighting devices; and (2) operate as a slave when the initial control input is received by another one of the lighting devices, the slave receiving the instructions corresponding to the initial control input from the master.

8. The lighting system according to claim 7 wherein the initial control input can be transmitted directly to exactly one of the lighting devices in the communication network at a given moment in time.

9. The lighting system according to claim 8 wherein the initial control input is transmitted directly to only one of the lighting devices in the communication network at a given moment, and wherein the instructions are transmitted, either directly or indirectly, from the one of the lighting devices to each of the other lighting devices.

10. The lighting system according to claim 7 wherein the initial control input controls at least one of on/off and light intensity of each of the lighting devices in the communication network.

11. The lighting system according to claim 10 wherein the initial control input increases the light intensity of the lighting device that directly receives the initial control input and decreases the light intensity of the other lighting devices in the communication network; or wherein the initial control input decreases the light intensity of the lighting device that directly receives the initial control input and increases the light intensity of the other lighting devices in the communication network.

12. A lighting system comprising:
a plurality of lighting devices interconnected with one another in a communication network;
each lighting device comprising at least one light source, a control device that controls the light source and is activated by an input generated external to the communication network, and a communication device associated with the control device that connects the lighting device to the communication network;
wherein each of said lighting devices in the communication network is configured to directly receive the input and operate as a master in the communication network with the other lighting devices in the communication network receiving instructions related to the input from the lighting device that directly received the input and acting as slaves in the communication network; and
wherein a particular one of the lighting devices that operates as the master changes over time based on which of the lighting devices in the communication network directly receives the input.

13. The lighting system according to claim 12 wherein each of said lighting devices is configured to act as a master if the input is received directly by that lighting device and as a slave if the input is received directly by another one of the lighting devices in the communication network.

14. The lighting system according to claim 12 wherein the input is transmitted directly to only one of the lighting devices in the communication network and wherein the instructions are transmitted, either directly or indirectly, from the one of the lighting devices to each of the other lighting devices.

* * * * *